United States Patent

O'Rear et al.

[11] 3,879,430
[45] Apr. 22, 1975

[54] HIGHLY FLUORINATED DIGLYCIDYL ETHERS

[75] Inventors: Jacques G. O'Rear, Camp Springs; James R. Griffith, Riverdale Heights, both of Md.

[73] Assignee: The United States of America as represented by the Secretary of the Navy, Washington, D.C.

[22] Filed: Sept. 13, 1973

[21] Appl. No.: 397,207

[52] U.S. Cl............ 260/348 R; 260/2 EP; 260/2 N; 260/77.5 AP; 260/618 D; 260/611 A; 260/575; 260/141
[51] Int. Cl............................................. C07d 1/18
[58] Field of Search ................................ 260/348 R

[56] References Cited
UNITED STATES PATENTS 3,706,772  12/1972  Reines............................ 260/348 R
3,707,483  12/1972  Reines............................ 260/348 R

OTHER PUBLICATIONS

S. A. Reines et al., Jour. Org. Chemistry, Vol. 35, No. 8, (1970), pp. 2772–2777.
S. A. Reines et al., Jour. Org. Chemistry, Vol. 36, No. 9, (1971), pp. 1209–1213.
Griffith, James R. et al., Amer. Chem. Soc., Div. Org. Coatings Plast. Chem. Pap., (1971), 31 (1) pp. 546–551.

*Primary Examiner*—Norma S. Milestone
*Attorney, Agent, or Firm*—R. S. Sciascia; Arthur L. Branning

[57] ABSTRACT

Fluorinated diglycidyl ethers having the formula

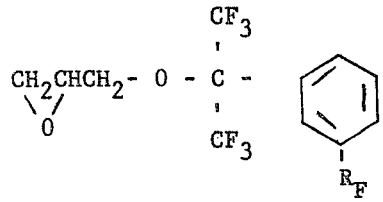

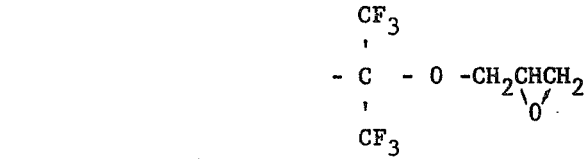

wherein $R_F$ is $CF_3(CF_2)_x$ for X from 2 to 10 are synthesized.

3 Claims, No Drawings

HIGHLY FLUORINATED DIGLYCIDYL ETHERS

BACKGROUND OF THE INVENTION

The invention relates to the synthesis of heavily fluorinated aromatic diglycidyl ethers. More specifically, it relates to the production of an epoxy resin having a high perfluoroaliphatic content.

By synthesizing fluorinated diglycidyl ethers via iodide precursors, an epoxy is produced that is a clear, colorless liquid at ambient temperatures. The epoxy may be cured with conventional epoxy curing agents such as diamines to form a tough hard polymer, or it may be used to prepare urethane coatings via prepolymers. To form the prepolymers the diglycidyl ether is reacted with a fluorinated diol. The urethane coating is then produced in a manner similar to that set out in my assignee's copending application Ser. No. 373,322, filed June 25, 1973 and now U.S. Pat. No. 3,852,222, issued Dec. 3, 1974.

THE INVENTION

The invention relates to a novel diglycidyl ether having the formula

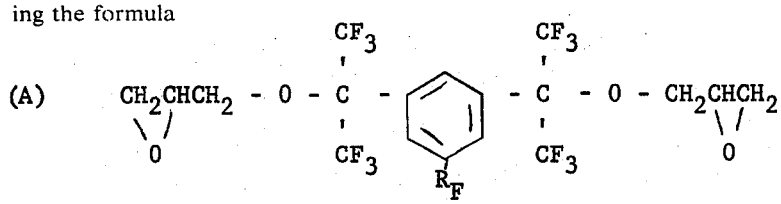

and its method of preparation. $R_F$ is $CF_3(CF_2)_x$ where $x$ is integer from 2 to 10. The diglycidyl ether is formed via an iodide precursor of the formula

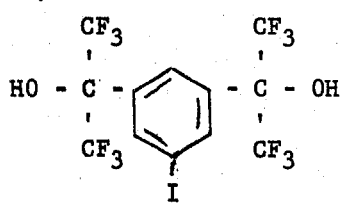

The iodide precursor is formed through one of two routes. Scheme 1 illustrates a multistep route to form the iodide precursor while Scheme 2 illustrates a one step route to form the iodide precursor.

Scheme 1

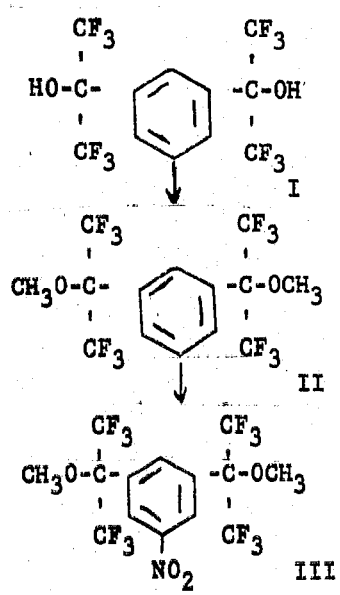

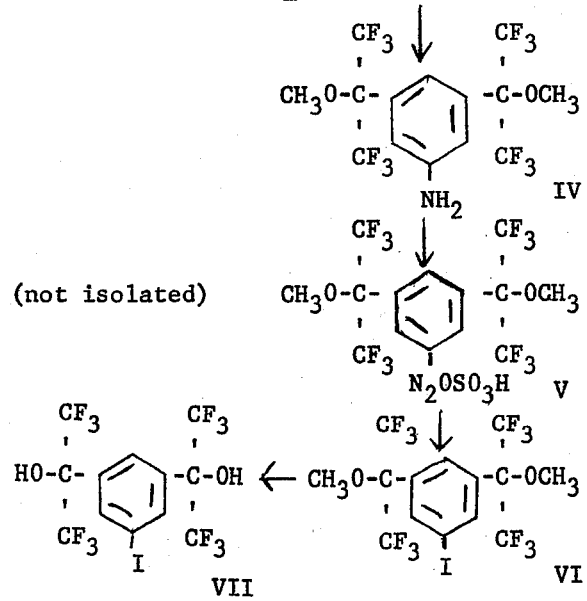

Scheme 2

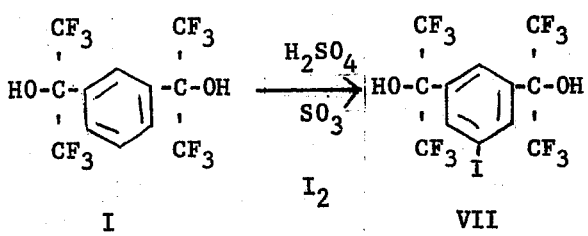

Scheme 1 can be further explained by the following examples:

EXAMPLE I

Preparation of 1,3-Bis-(2-hydroxyhexafluoro-2-propyl)-benzene, I

This compound was prepared from benzene and hexafluoroacetone: bp 106°/20.0 mm Hg; $n_D{}^{20}$ 1.3882; lit. (8) bp 99°/20.0 mm Hg.

EXAMPLE II

Preparation of 1,3-Bis-(2-methoxyhexafluoro-2-proplyl)-benzene, II

The m-diol (I) (615 g, 1.50 moles) was dissolved in a mixture of sodium hydroxide (132 g, 3.30 moles) and water (800 ml). Dimethyl sulfate (378 g, 3.00 moles) was added dropwise with stirring during 2 hours (reaction temperature 65°C). Overnight the cooled reaction mixture deposited crude white crystals analyzing 90% II and 10% the corresponding monomethyl ether. The crude product was dissolved in t-butyl alcohol (400 ml) and submitted to a second methylation using only one half of the original amounts of caustic and dimethyl sulfate. The final produce was precipitated by adding water (2,000 ml), collected by filtration, washed and dried to yield white crystals of analytical II: 828 g, 95.9% yield; mp 81°-84°.

EXAMPLE III

Preparation of
1,3-Bis(2-methoxyhexafluoro-2-propyl)-nitrobenzene, III

The diether (II) (320 g, 0.703 mole) was added portionwise during 1 hour to a stirred mixture of fuming nitric acid (500 ml, 10.5 mole) and concentrated sulfuric acid (300 ml). The reaction temperature during this period was gradually raised from 40° to 50°C by the use of a water bath. A reddish brown oil began to form. Stirring and heating were continued until the reaction temperture reached 52°–53°C, where it was maintained (10 to 15 minutes) until it began to rise. The exothermic reaction was readily moderated by removing the water bath. Heating and stirring were resumed so that a reaction temperature of 55°C was maintained for 1 hour. The floating red oil was separated, washed with water and then dilute caustic solution. Distillation through a 12 inches Vigreaux column gave the analytical III as a yellow oil: 314 g; 91.1% yield; bp 136°–137°C/10.0 mm Hg; $n_D^{20}$ 1.4133.

EXAMPLE IV

Preparation of
1,3-Bis(2-methoxyhexafluoro-2-propyl)-aniline, IV.

A 5-liter flask was charged with a mixture of mossy tin (0.894 mole), ethyl alcohol (1,000 ml) and 12 N hydrochloric acid (1,000 ml). The hydrogen generator was maintained at 60°–70°C by the use of a water bath. A mixture of III (310 g, 0.642 mole) and ethyl alcohol (300 ml) was added dropwise during 2 hours along with increments of mossy tin (6 × 60 g, wetted with 12 N hydrochloric acid). Stirring and heating were continued for 2 more hours. The reaction mixture was filtered and the filtrate acidified to precipitate the hydrochloride of IV and tin salts. Stirring the mixture with water (12 liters) dissovled the tin salts. The crude amine hydrochloride was collected, water washed, dissolved in methyl alcohol (500 ml) and reacted with 2.5% sodium hydroxide solution (4000 ml) to precipitate the free amine. The crude amine was collected, taken up in ether, the ether extract water washed and dried. Evaporation left 249 g of crude amine; purity 95% by glc; mp 106°–110°C. Recrystallization from methyl alcohol in 1:1 amine/solvent ratios at −40°C led to white crystals of analytical IV: 210 g; 72.0% yield; mp 108°–111°C.

EXAMPLE V

Preparation of
1,3-Bis-(2-methoxyhexafluoro-2-propyl)-5-iodobenzene, VI

Diazotization of IV was accomplished by adding nitrosyl sulfuric acid (125 ml), prepared by Hodgson's method (9), during 20 miuntes to a mixture of IV (99.0 g, 0.218 mole) dissolved in glacial acetic acid (1,190 ml). The reaction temperature was maintained at about 15°C by strong external cooling (−15°C). The resulting clear, yellow mixture was poured onto a stirred mixture of ice (1,500 g) and water (1,500 g). A yellow precipitate formed. Stirring was continued for 30 minutes to give a slurry of the diazonium sulfate V (at 8°C). Displacement of the sulfate group by the iodide ion was performed by adding a mixture of potassium iodide (42.0 g, 0.254 mole) and water (200 ml) to the cold slurry (addition time 20 min.). A red-brick precipitate of the diazonium iodide rose to the surface. The reaction mixture was heated 1 hour at 85°C to decompose the diazonium salt to a heavy orange oil. Iodine generated during the decomposition was destroyed with sodium thiosulfate (12 g.). The heavy orange oil (67g) was separated from the aqueous layer. The latter was saturated with sodium chloride and then extracted with ether. The orange oil and ether extract were combined, neutralized, dried and distilled through a 12 inch Vigreaux to give 93.6 g of crude VI: bp 90°–96°C/1.0 mm Hg; 97% VI and 3% II by glc. Precise fractionation (Nester Faust) gave analytical VI as viscous colorless oil: 88 g, 71.5% yield; bp 126°C/10 mm Hg; $n_D^{20}$ 1.4385.

EXAMPLE VI

Preparation of
1,3-Bis-(2-hydroxyhexafluoro-2-propyl)-5-iodobenzene, VII, by demethylation of VI A mixture of VI (0.645 mole) and chlorobenzene (900 ml) was added with stirring during 10 minutes to a mixture of aluminum chloride (209 g) and chlorobenzene (826 g). For the next 30 minutes, a heating bath was used to raise the reaction temperature to 73°C. At this point the reaction temperature rose to 80°C but was readily lowered by removing the bath. Heating and stirring were resumed so as to maintain a reaction temperature of 73°for an additional hour. The demethylated mixture was washed with water (2,000 ml) and extracted with a mixture of sodium hydroxide (6.6 moles) and water (6,400 ml). The alkaline solution was extracted with ether (2 lbs) to remove chlorobenzene, then acidified with 12 N hydrochloric acid (9.1 mole) to precipitate crude VII as a heavy oil which was separated and washed with sodium thiosulfate solution. The resulting orange oil was distilled (Nester Faust Teflon Spinning Band Still) to give analytical VII as a colorless viscous oil: 242.0 g, 70.0% yield; bp 115°C/10.0 mm Hg; $n_D^{20}$ 1.4415.

An illustration of the one step procedure utilized to form the iodide precursor is manifested by the following example.

EXAMPLE VII

Preparation of
1,3-Bis-(2-hydroxyhexafluoro-2-propyl)-5-iodobenzene, VII, by Direct Iodination Into a 500 ml flask fitted with a reflux condenser and magnetic stirrer are placed II (50.0 g, 0.122 mole) and 30% fuming sulfuric acid (83 ml). The reaction generated some heat and precipitated a solid, presumably sulfate esters. Then iodine (15.8 g, 0.124 g. atom) was added through the condenser and stirred into a slurry. As the mixture was heated to 65°C (bath), the stirrer became functional. During the first hour the reaction temperature was slowly raised to 100°C. Thereafter it was raised to 120°C where it was maintained for an additional hour. The resulting dark brown mixture was diluted with water and neutralized with 4% sodium hydroxide solution. Acidification with hydrochloric acid precipitated a heavy oil which was separated and washed with sodium bisulfite solution to remove unreacted iodine. The heavy oil was taken up in ether, and ether extract dried and distilled (Nester Faust) to give analytical VII, identical with the produce prepared via Scheme 1: 25 g, yield 38.2%; bp 115°C/ 110.0 mm; $n_D^{20}$ 1.4415.

The iodide precursor is then used to form a fluoroaliphatic precursor as illustrated by Scheme 3.

Scheme 3

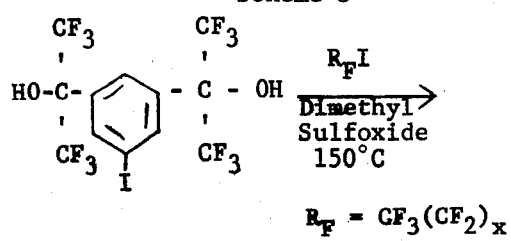

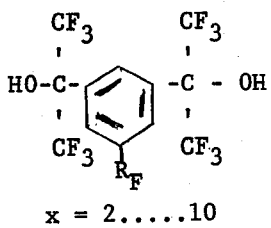

$x = 2\ldots\ldots10$

Specific examples of the fluoroaliphatic precursor where $x = 2$ and $x = 6$ is illustrated by Scheme 3' and explained by the examples that follow.

Scheme 3'

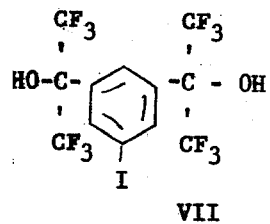 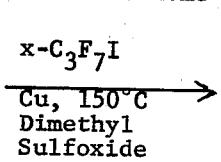 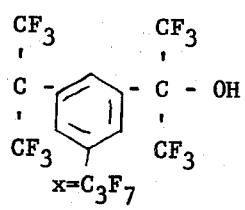

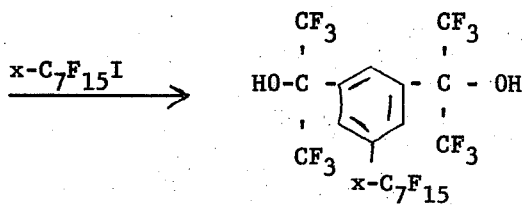

EXAMPLE VIII

Preparation of 1,3-Bis-(2-hydroxyhexafluoro-2-propyl)5-heptafluoropropylbenzene, IX A stainless steel Parr bomb (2,000 ml) equipped with a magnetic stirrer was charged with activated copper bronze (6.35 g; 0.10 mole), the iodoaromatic diol VII (53.6 g, 0.10 mole), heptafluoropropyl iodide (23.7 g, 0.08 mole) and dimethyl sulfoxide (200 g). The bomb was closed, cooled to −80°C, opened, evacuated to 1 mm Hg, and closed again. The reaction mixture was stirred and heated at 150°C for 16 hours. Contents of the bomb were washed out with acetone (300 ml) and filtered. The filtrate was diluted with water (1,000 ml) to precipitate a heavy oil. This oil was dissolved in 4% sodium hydroxide solution (1,000 ml) and the solution filtered. The oil was reprecipitated by adding concentrated hydrochloric acid (100 ml), separated, water washed, dried and distilled to yield analytical IX: 23.6 g, 51.0% yield, bp 94°C/10.0 mm Hg; mp 48°C.

EXAMPLE IX

Preparation of 1,3-Bis-(2-hydroxyhexafluoro-2-propyl)-5-pentadecafluoroheptyl-benzene, X The stainless steel bomb of the previous example was charged with activated copper bronze (21.3 g; .336 mole), the iodoaromatic diol VII (180.0 g, 0.336 mole), perfluoro-n-heptyl iodide (133.1 g; 0.268 mole) and dimethyl sulfoxide (271). The customary work-up as in example VIII led to 208 g of crude oil (assaying about 50% X and 40% of the more volatile VII. Precise fractionation provided the analytical X: 60.0 g, 39.1 yield; bp 85°C/0.8 mm, $n_D{}^{20}$ 1.354.

The fluoroaliphatic precursor is thus used to form the actual diglycidyl ether via Scheme 4.

Scheme 4

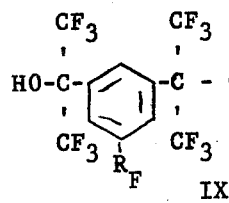

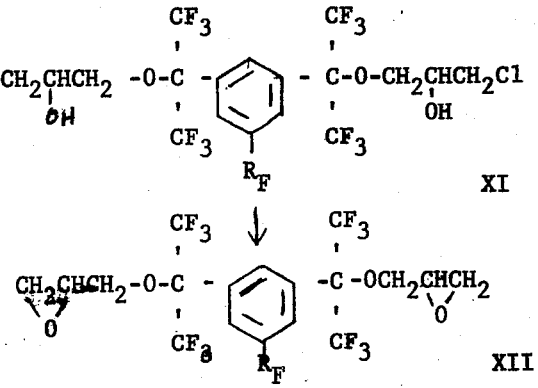

An illustration of the formation of the diglycidyl ether is set out by Example X and XI.

EXAMPLE X

Preparation of the diglycidyl ether of 1,3-Bis-(2-hydroxyhexa-fluoro-2-propyl-5-hexafluoropropyl-benzene, XII A mixture of the aromatic diol IX wherein $R_F$ is $CF_3(CF_2)_x$ and $x=2$ (17.34 g, 0.030 mole), epichlorohydrin (16.65 g, 0.180 mole) and tetramethylammonium bromide (0.324 g) was stirred and maintained at 50°C for 96 hours. Evaporation at 90°C/20 mm Hg left 23.4 g of viscous clear liquid assaying 98% dichlorohydrin ether, XI, by glc. Dehydrochlorination of XI was accomplished by mixing it with toluene (21.4 g) and ethanol (7.1 g) and stirring at 50°C during a three-stage reaction with 18 percent sodium hydroxide solution. Addition time for the first stage caustic solution (16.8 g) was 1 hour, with 30 minutes additional stirring. The upper aqueous phase was discarded. Ethyl alcohol (3 g) was added to the lower phase and the second stage caustic (5.6 g) was added during 30 minutes. The lower phase was separated, mixed with ethyl alcohol (3 g) and the third stage caustic (5.6 g) added during 30 minutes. The final lower layer was separated, taken up in ether, the ether extract water washed and concentrated at 100°C/10 mm Hg to 20.1 g of viscous, clear liquid. Distillation through a short-path still furnished two fraction: 6.5 g, bp 115°–117°C/ 0.15 mm Hg, assaying 99% XII by glc and 11.43 g, bp 118°C/ 0.15 mm Hg of analytical XII; $n_D^{20}$ 1.3940; total yield 86.5%.

EXAMPLE XI

Preparation of the diglycidyl ether of 1,3-Bis-(2-hydroxyhexafluoro-2-propyl)-5-hexafluoropropyl-benzene, XII A mixture of the aromatic diol IX wherein $R_F$ is $CF_3(CF_2)_x$ and $x=6$ (25 g, epichlorohydrin (17.8 g, .193 mole) and tetramethylammonium bromide (0.347 g) was stirred and maintained at 50°C for 96 hours. Evaporation at 90°C/20 mm Hg left 27.7 g of viscous clear liquid assaying 97% dichlorohydrin ether, XI, by glc. Dehydrochlorination of XI was accomplished by mixing it with toluene (21.4 g) and ethanol (7.1 g) and stirring at 50°C during a three-stage reaction with 18% sodium hydroxide solution. Addition time for the first stage caustic solution (16.8 g) was 1 hour, with 30 minutes additional stirring. The upper aqueous phase was discarded. Ethyl alcohol (3 g) was added to the lower phase and the second stage caustic (5.6 g) added during 30 minutes. The lower phase was separated, mixed with ethyl alcohol (3 g) and the third stage caustic (5.6 g) added during 30 minutes. The final lower layer was separated, taken up in ether, the ether extract water washed and concentrated at 100°C/10 mm Hg to 20.1 g of viscous, clear liquid. Distillation through a short-path still furnished two fractions: 4.8 g, bp 136°–140°C/0.4 mm Hg assaying 99% XII by glc and 19.9 g, bp 140°C /0.5 mm Hg of analytical XII; $n_D^{20}$ 1.3618 total yield 78.0%

Thus, the iodide precursor is formed through either a multistep route or a one step route. The iodide precursor is used to form the fluoroaliphatic precursor which is then utilized to form the novel diglycidyl ether.

The diglycidyl ether may be cured with well known epoxy curing agents and then used as a coating or it may be used to prepare urethane coatings. It is especially useful in that it is a liquid at ambient temperatures.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A fluorinated diglycidyl ether of the formula

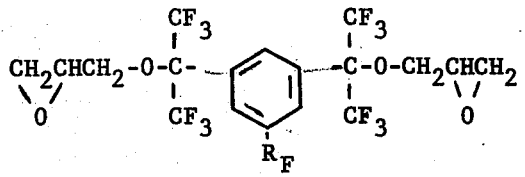

wherein $R_F$ is $CF_3(CF_2)_x$, $x$ being an integer from 2 to 10.

2. A diglycidyl ether according to claim 1 wherein $x = 2$.

3. A diglycidyl ether according to claim 1 wherein $x = 6$.

* * * * *